United States Patent [19]
Zeller et al.

[11] Patent Number: 5,590,287
[45] Date of Patent: Dec. 31, 1996

[54] CONFIGURABLE INTERFACE FOR ROUTING DATA BETWEEN MISMATCHED DEVICES

[75] Inventors: Charles P. Zeller, Austin; Terry J. Parks, Round Rock; Michael D. Durkin, Austin, all of Tex.

[73] Assignee: Dell USA, L.P., Austin, Tex.

[21] Appl. No.: 207,810

[22] Filed: Mar. 7, 1994

Related U.S. Application Data

[63] Continuation of Ser. No. 559,872, Jul. 27, 1990, abandoned.

[51] Int. Cl.⁶ .............................. G06F 9/315; G06F 13/40
[52] U.S. Cl. .................... 395/250; 364/DIG. 1; 364/DIG. 2; 395/500
[58] Field of Search ...................... 395/375, 325, 395/800, 200, 500, 575, 250, 275, 417, 484, 483, 455, 842, 497.2; 364/DIG. 1:DIG. 2; 371/21.1

[56] References Cited

U.S. PATENT DOCUMENTS

| | | | |
|---|---|---|---|
| 3,975,712 | 8/1976 | Hepworth et al. | 371/47.1 |
| 3,979,732 | 9/1976 | Hepworth et al. | 395/325 |
| 4,150,364 | 4/1979 | Baltzer | 395/100 |
| 4,309,754 | 1/1982 | Dinwiddie, Jr. | 395/325 |
| 4,443,846 | 4/1984 | Adcock | 395/325 |
| 4,447,878 | 5/1984 | Kinnie et al. | 395/325 |
| 4,467,443 | 8/1984 | Shima | 395/425 |
| 4,509,113 | 4/1985 | Heath | 395/275 |
| 4,523,276 | 6/1985 | Maejima et al. | 395/275 |
| 4,580,129 | 4/1986 | Bahgat | 341/67 |
| 4,593,267 | 6/1986 | Kuroda et al. | 364/931.11 |
| 4,633,437 | 12/1986 | Mothersole et al. | 395/250 |
| 4,667,305 | 5/1987 | Dill et al. | 395/325 |
| 4,683,534 | 7/1987 | Tietjen et al. | 395/325 |
| 4,716,527 | 12/1987 | Graciotti | 395/500 |
| 4,727,477 | 2/1988 | Gavril | 395/275 |
| 4,766,538 | 8/1988 | Miyoshi | 364/200 |
| 4,797,850 | 1/1989 | Amitai | 395/425 |
| 4,907,203 | 3/1990 | Wada et al. | 371/21.1 |
| 5,023,828 | 6/1991 | Grundmann et al. | 395/375 |
| 5,163,145 | 11/1992 | Parks | 395/500 |
| 5,243,701 | 9/1993 | Muramatsu et al. | 395/325 |

Primary Examiner—Daniel H. Pan
Attorney, Agent, or Firm—Henry N. Garrana; Mark P. Kahler; Michelle M. Turner

[57] ABSTRACT

A digital computer system includes an interface for routing data which permits the transfer of data between mismatched devices. The computer system comprises a processor, memory and an interconnecting data bus, all configured to handle data units of a first data width. Also connected to the data bus is at least one I/O device configured to handle data units of a second data width. By adjusting the width of the data being transferred to match the width of the receiving device or bus, data may be transferred between devices of differing width. To adjust the width, control means are provided which modify the route along which data bytes are transferred based upon the width of the transferring and receiving devices and the direction of transfer are provided.

37 Claims, 4 Drawing Sheets

CONFIGURABLE INTERFACE FOR ROUTING DATA BETWEEN MISMATCHED DEVICES

This is a continuation of application Ser. No. 07/559,872, filed Jul. 27, 1990 now abandoned.

CROSS REFERENCE TO RELATED APPLICATIONS

This application is related to the following U.S. patent applications:

| SER. NO. | TITLE | INVENTOR | FILING DATE |
| --- | --- | --- | --- |
| 07/490,003 | Method and Apparatus for Performing MultiMaster Bus Pipelining | Zeller, et al. | 03/07/90 |
| 07/540,983 abandoned | Error Correction Code Pipeline for Interleaved Memory | Matteson, et al. | 06/19/90 |
| 07/589,341 U.S. Pat. No. 5,357,622 | Method and Apparatus for Assembling and Queuing Digital Data Words in a Digital Computer System | Parks, et al. | |
| 07/541,103 U.S. Pat. No. 5,276,832 | Computer System Having a Selectable Cache Subsystem | Holman | 06/19/90 |
| 07/529,985 abandoned | Processor and Cache Controller Interface Lock Jumper | Holman, et al. | 05/25/90 |
| 07/540,651 U.S. Pat. No. 5,241,643 | Address Enabling System and Method for Memory Modules | Holman, et al. | 06/19/90 |
| 07/532,046 abandoned | Multiple DRAM Assemblies Using a Single PCB | Holman | 05/25/90 |
| 07/532,045 U.S. Pat. No. 5,070,450 | Power-On Coordination System and Method for Multi-Processor | Holman, et al. | 05/25/90 |
| 07/540,049 abandoned | A Digital Computer Having a System for Sequentially Refreshing an Expandable Dynamic RAM Memory Circuit | Matteson, et al. | 06/19/90 |
| 07/559,230 abandoned | Processor Which Performs Memory Access in Parallel with Cache Access and Dynamic RAM Memory Circuit | Parks, et al. | 07/27/90 |
| 07/516,628 abandoned | Minimized Error Correction Bad Bit Decoder | Longwell, et al. | 04/30/90 |
| 07/516,606 abandoned | Shared Logic for Error Correction Syndrome Encoding | Longwell, et al. | 04/30/90 |

The above listed applications are all assigned to the assignee of this invention and are herein incorporated by reference as if reproduced in their entirety.

BACKGROUND OF THE INVENTION

1. Field of the Invention

The invention relates to a method and apparatus for routing data words between components of a computer system and, more particularly, to a method and apparatus for routing data words between components of a computer system such as the processor, memory and/or input/output devices, whether or not the components are configured to process data words of the same width.

2. Description of Related Art

As is well known to those skilled in the art, a computer system consists of a number of subsystems interconnected by paths that transfer data between the subsystems. Two such subsystems are a central processing unit ("processor") or processor subsystem and a memory and storage subsystem ("memory") which may comprise multiple memory devices. The processor controls the operation of the computer system by executing a sequence of instructions to perform a series of mathematical operations on data. Both the instructions and the data are stored in the computer's memory as binary information, patterns of logical ones and zeros. While the processor and memory represent the most essential subsystems of a computer systems, virtually all computer systems also include any number of input/output ("I/O") devices for the transfer of information into and out of the computer system. The most common I/O devices used with a computer system include a keyboard for entering information and instructions, a video monitor and printer for getting information back out to the user and a disk drive or hard disk for making permanent records of stored information or for running additional software. To install an I/O device in a computer system, the I/O device is connected to an outlet on the computer ("I/O port") which, in turn, provides a path between the I/O device and the computer subsystems.

As is further well known to those skilled in the art, all computer systems further include communications channels or "buses" between the processor, memory and any other subsystems included in a particular computer system. Typically, computer systems are provided with a data bus for carrying data to and from the memory, an address bus for carrying signals used to locate a given memory address and a control bus for carrying timing and control pulses to all subsystems included in a computer system. In addition, the I/O ports are also connected to the buses to link the I/O devices to the computer systems.

Information is transferred between computer components in the form of data words. A data word is a sequence of binary digits or "bits", each bit equivalent to a "1" or a "0". While the size of a data word may vary between computer components of different design, data words are most commonly between 8 and 32 bits in length. In general, as increasingly faster computer systems are sought, the size of data words has increased so that data may be processed in larger units and more bits of data are moved through the system per unit of time. For example, while processor subsystems which used 16 bit words were common only a few years ago, the present state of the art processor subsystems, such as the 80386 and 80486 microprocessors made by Intel Corporation, utilize 32 bit, so-called, double word architectures to handle data faster. Similarly, computer system memory subsystems can now store and handle data in 64 bit units, i.e., four contiguous words of 16 bits each or two contiguous double words of 32 bits each, again for faster access.

Each computer subsystem and/or I/O device which combines to form a computer system is configured to transfer data in units which comprise a specified number of bits. The number of bits which a subsystem or I/O device may process as a single unit is generally referred to as its "data width". When a pair of subsystems, such as a pair of I/O devices or an I/O device and a subsystem are configured to have the same data width, the two are "homogeneous" or "matched"

with each other. When the transmitting device outputs data in the same sized units which the receiving device is designed to access, data transfers between homogeneous devices along a connecting bus are relatively simple. If, however, the pair of subsystems, pair of I/O devices or the I/O device and the subsystem are configured with different data widths, the two are "heterogeneous" or "mismatched". As heterogeneous devices cannot address the connecting bus in the same size data units, data transfers between heterogeneous devices are more complicated. Computer systems which are comprised of mismatched subsystems and/or I/O devices result for any number of reasons. For example, the technological developments which have permitted the transmission of data in increasingly larger units are often chronologically unevenly spaced. Thus, while an existing I/O device may have matched an older 8, or even 16, bit processor subsystem, the same I/O device would be mismatched if connected with a newer, 32 bit processor subsystem. As a result, a system designer, in order to benefit from an improvement in the operating speed of one computer subsystem resulting from an improved subsystem which handles larger units of data, would be forced to replace all of the subsystems and I/O devices which could not access the same size of data unit unless there was some way to compensate for the mismatched devices. For example, U.S. Pat. No. 4,716,527 to Graciotti is directed to a device for making a 16 bit data bus microprocessor compatible with peripherals, expansion devices and associated software designed for an 8 bit data bus by providing a bus converter which receives data from the 16 bit data bus and divides the data bus into high and low portions. The low and high portions may then be selectively coupled to the 8 bit data bus. That is, if a 16 bit word from the microprocessor is being transferred to an 8 bit wide external device, the upper and lower portions are selectively coupled to the 8 bit wide external device.

While the connection of a wider data bus to a narrow data bus by means of a data register having a width corresponding to that of the wider data bus and selector circuitry for connecting different portions of the data register to the narrower data bus one at a time in an appropriate sequence may provide a satisfactory operation, such types of interfacing mechanisms can present a bottleneck to the movement of data in other applications. In particular, where multiple data handling units are connected to one side of the interface mechanism and the data handling units on opposite sides of the interface mechanism are not always ready to perform a data transfer at the same moment, then delays may be encountered when one of the multiple units has to wait on the completion of a data transfer for another of the multiple units. Similarly, U.S. Pat. No. 4,309,754 to Dinwiddie, Jr. is directed to a data interface mechanism for interfacing busses of different bit widths. To convert data bytes into plural-byte data words, Dinwiddie, Jr. provides a plurality of-random access (RAM) storage units located between the two data busses and an addressing structure for producing control signals. For successive data transfers to or from the narrower data bus, a series of different chip select signals select the different RAM units, one after the other, in a repeating sequence to transfer successive data bytes. Like Graciotti, however, the repeating access sequence makes Dinwiddie, Jr. particularly inflexible should the relative widths of the interfacing busses change. Furthermore, the chip select signals generated by the Dinwiddie, Jr. circuitry would be unable to transfer data between changing width interface differences.

SUMMARY OF THE INVENTION

In one aspect, the present invention comprises a digital computer system having a data interface for transferring data units output by an 8, 16 or 32 bit wide I/O device to a 32 bit wide data bus. Bytes of data are output by the I/O device. Depending on the width of the I/O device, each output byte will either be a first, second, third or fourth data byte. The data interface comprises a series of four latches and means for separately routing each first, second, third and fourth data byte output from the I/O device to the input of at least one of the latches. A 32 bit data word is accumulated at the output of the latches and then transmitted to the data bus.

In another aspect, the present invention comprises a digital computer system having a data interface for transferring data units output by a 32 bit wide data bus to an 8, 16 or 32 bit wide I/O device. The data interface comprises an output driver means of a width equal to the width of the I/O device, a first multiplexer having at least one input tied to the output of the data bus and an output tied to the output driver means, a second multiplexer having at least one input tied to the output of the data bus and an output tied to the output driver means, a direct connection between the output of the data bus and the input of the output driver means, and means for separately routing each first, second, third and fourth data byte output by the 32 bit data bus to the output driver means. In yet another aspect, the invention comprises a digital computer system having a data interface for transferring data units output by an 8, 16 or 32 bit wide I/O device to a 32 bit data bus by accumulating the 8, 16 or 32 bit wide data units output by the I/O device into a 32 bit data word and transferring data units output by the 32 bit wide data bus to the 8, 16 or 32 bit wide I/O device without data accumulation. The two-way data interface comprises first, second, third and fourth latches, means for separately routing first, second, third and fourth data bytes output from the I/O device to the input of one of the latches, means for latching the data bytes routed to the output of each of the latches, thereby accumulating the 32 bit data word at the latch outputs, means for transmitting the accumulated 32 bit data word to the data bus, an output driver and means for separately routing first, second, third and fourth data bytes output from the 32 bit data bus to the output driver means without accumulation.

In still another aspect, the present invention comprises a computer system which permits the transfer of data between mismatched devices. The computer system comprises a processor subsystem, memory subsystem and an interconnecting processor bus, all configured to handle data units of a first data width. Also connected to the processor bus is at least one I/O device configured to handle data units of a second data width. By adjusting the width of the data being transferred to match the width of the receiving device or bus, data may be transferred between devices and/or subsystem of different data widths. To adjust the width, control means which modifies the route along which data bytes are transferred based upon the width of the transferring and receiving device or subsystem and the direction of transfer are provided.

In general summary, this invention replaces specific data routing and latching components with a set of bussed signals that control the data routing with a code or a sequence of codes for each data transfer. These data routing signals are generated by the computer system which must include one or more devices that have a maximum data width at the bus interface and that perform the routing protocol.

During a transfer between a routing device and a non-routing device, the bus interface logic of the routing device will implement the one or more routing codes as the one or more transfers with the other device occurs. During a transfer between two non-routing devices, the bus interface unit of a selectable routing device implements the routing service for the system if the two non-routing devices are mismatched and therefore require routing.

The advantage of this invention is that fewer components are required. Upwardly compatible computer systems support coexisting multi-generations of bus protocols. If the I/O devices which implement the protocol that includes data routing have appropriate bus interfaces, then the routing bus interface logic can be cheaply integrated.

It is an object of this invention to provide means to interface a computer subsystem and an I/O device data bus such that data may be transferred between the two in spite of mismatched data widths.

It is another object of this invention to provide a computer system processor bus having an interface between a computer subsystem and a mismatched I/O device as well as an interface between a pair of mismatched I/O devices.

BRIEF DESCRIPTION OF THE DRAWINGS

The present invention may be better understood, and its numerous objects, features and advantages will become apparent to those skilled in the art by referencing the accompanying drawings in which.

DETAILED DESCRIPTION OF THE INVENTION

Figure 1:
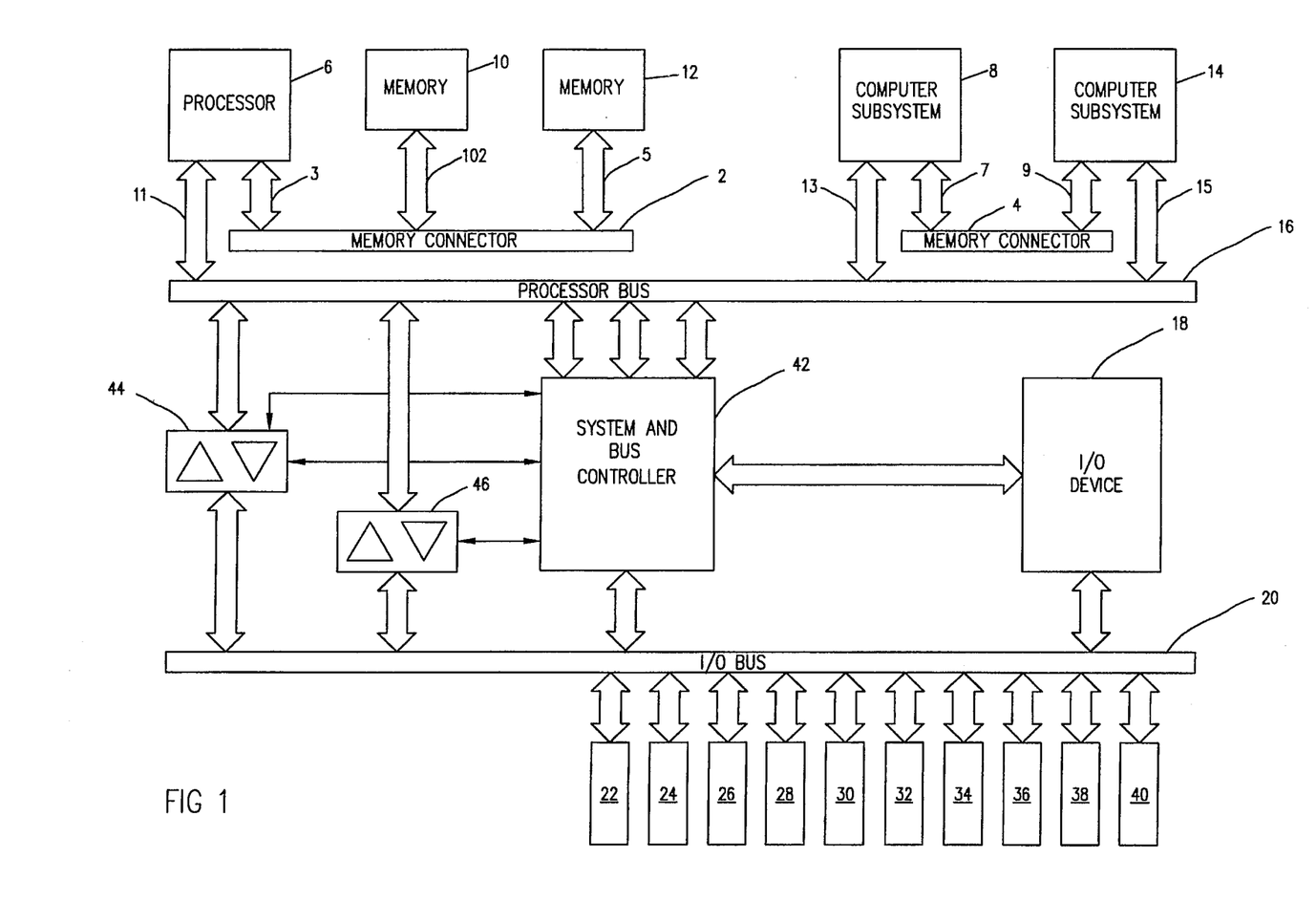
FIG. 1 is a top level block diagram of a computer system.

Referring now to the drawings wherein like reference numerals designate identical or similar elements throughout the several views, depicted in FIG. 1 is a general high level block diagram of a computer system. The present invention will herein initially be considered at this level, and at a number of successive, more detailed levels, to ensure full understanding and appreciation of the role and operation of the present invention in an environment in which it could be usefully employed.

FIG. 1 illustrates a personal computer system employing the system of the present invention. Seen here are four main buses which represent the major interfaces at the top level. These main buses are a first memory connector 2, a second memory connector 4, a processor bus 16 and an I/O bus 20. The first memory connector is a private interface between a processor subsystem 6, a first memory subsystem 10 dedicated to the processor subsystem 6 and a second memory subsystem 12, also dedicated to the processor subsystem 6. Preferably, the first and second memory subsystems 10 and 12 are each configured as a 64 bit interleaved memory with two associated banks for storage of one 32 bit double word each, one odd and one even. The processor subsystem 6, the first memory subsystem 10 and the second memory subsystem 12 are connected to the memory connector 2 by memory interfaces 3, 102, and 5, respectively. The processor subsystem 6 is also connected to the processor bus 16 by a processor interface 11.

The second memory connector 4 is also a private interface, here between a first computer subsystem 8 and a second computer subsystem 14. It is envisioned that various types of subsystems may be installed as the computer subsystems 8, 14, depending on the particular operating capabilities desired for the overall computer system. For example, the computer subsystem 8 may be a processor subsystem or an I/O device, although for purposes of the discussion to follow, a processor 8 shall be selected as the computer subsystem 8. Additionally, the computer subsystem 14 may be a processor subsystem, an I/O device or a memory subsystem, although for purposes of the discussion to follow, an intelligent I/O device 14 shall be selected as the computer subsystem 14. Each computer subsystem 8, 14 is provided with a memory interface 7, 9, respectively, to connect to the memory connector 4 and a processor interface 13, 15, respectively, to connect with the processor bus 16.

The processor bus 16 is a multiple master bus which is the architectural break between the processing subsystems (the processor 6 and the processor 8) and the I/O device, which include an I/O device 18, the I/O device 14, and, via an I/O bus 20, I/O expansion slots 22, 24, 26, 28, 30, 32, 34, 36, 38, 40. The processor bus 16 performs various functions. First, the processor bus 16 serves as a connection between the processors 6 and 8, and: the intelligent I/O device 14; all system memory including the first memory subsystem 10 and the second memory subsystem 12; and the I/O devices, which include the I/O device 18 and the I/O expansion slots 22, 24, 26, 28, 30, 32, 34, 36, 38, 40, all configured for installment of an I/O device therein.

As described above, the processor bus 16 allows each processor subsystem 6, 8 to access another processor subsystem's 8, 6 memory subsystem. This access is allowed "through" the processor that is directly connected to the memory. That is, when a processor connected to the processor bus 16 requests access to a location in some other processor's memory, the other processor completes the access locally, receives the address from the processor bus 16 and transfers the data from and to the processor bus 16. In addition, the processor bus 16 serves as a communication link between the processors 6 and 8. Through inter-processor communication mechanisms, each processor can address and interrupt each other processor.

Figure 2:
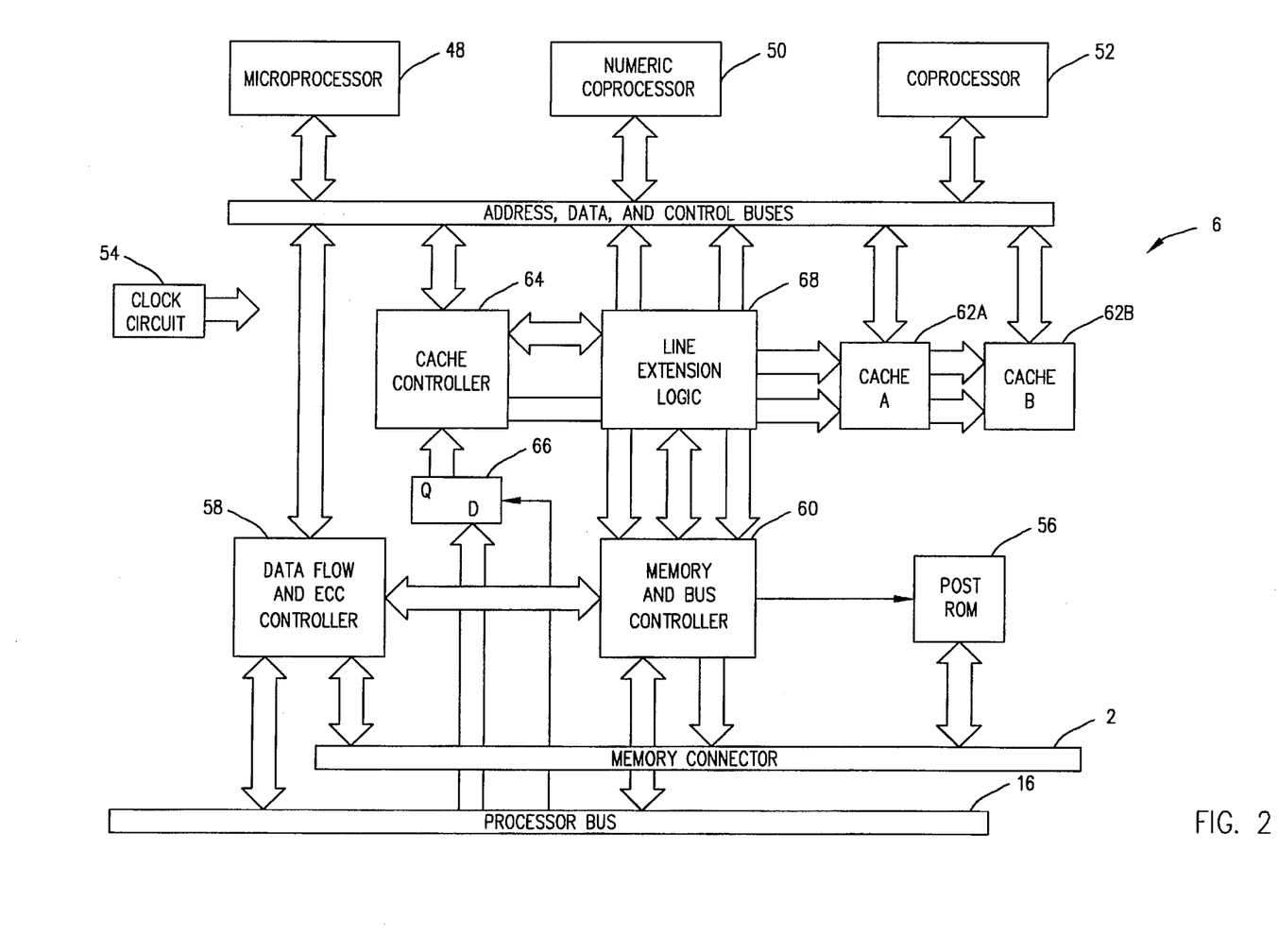
FIG. 2 is a block diagram of a processor subsystem such as could be employed in the computer system of FIG. 1.

In addition to the foregoing, the processor bus 16 also acts as the interface between the processor memory complexes and the I/O device 18. Through a system and bus controller 42, addresses and data are translated between the processor bus 16 and the I/O bus 20 through a set of transceivers 44, 46 (such as Model 74ALS245 transceivers made by Texas Instruments Incorporated). Through this interface, the processor bus master can access the I/O device 18 as well as the I/O expansion slots 22, 24, 26, 28, 30, 32, 34, 36, 38, 40. Still further, the processor bus 16 acts as the data path for I/O to I/O accesses. As to be more fully described later, the system and bus controller 42 generates "routing codes" which format the protocol necessary for inter-device communication and enable intelligent cards plugged into an I/O expansion slot to access other I/O cards or even the processor bus memory. The system and bus controller 42, in addition to providing routing information and routing code generation, also handles all processor bus 16 arbitration and interfaces all control signals to the system I/O 18 (such as ISA "commands", DMA control signals, and interrupts). Referring now to FIG. 2, there is shown a block diagram of the major components of a processor card. With reference to FIG. 1, this processor subsystem 6 can be seen to interface with the rest of the computer system through the memory connector 2 and the processor bus 16. Processor subsystem 6 includes a microprocessor 48 (e.g., an Intel 80386), a numeric coprocessor 50 (e.g., an Intel 80387), an optional coprocessor 52 (e.g., a Weitek 3167), a cache subsystem (discussed below), a clock circuit 54, a Power On, Self Test, Read Only Memory or "POST ROM" 56, a data flow and ECC controller 58, and a memory and bus controller 60.

The cache subsystem includes a cache memory (shown as consisting of two separate banks 62A, 62B of SRAMs and a cache controller 64 (e.g., an Intel 82385). As should be understood by those skilled in the art, the cache subsystem functions as an extremely fast, "sketchpad-like" memory which provides rapid access to the data most frequently needed by the processor. The system of the present invention may employ cache memory with cache line sizes of 4 double words each so that if a cacheable read is made by the processor, the memory controller returns 4 sequential double words into the cache from system memory.

The operation of the cache subsystem is described in greater detail in co-pending U.S. patent application, Ser. No. 07/559,230, entitled "Processor which Performs Memory Access in Parallel with Cache Access and Method Employed Thereby", filed Jul. 27, 1990, now abandoned, assigned to the assignee of this invention, and hereby incorporated by reference.

For systems with a cache 62A, 62B, a snoop address latch 66 is included to capture each processor address that is generated in order to invalidate addresses if necessary. Additionally, in systems with a cache memory, a programmable array logic ("PAL") line extension logic 68 is included to control address and control signals passing between the cache 62A, 62B, the cache controller 64, and the memory and bus controller 60.

The processor subsystem 6 also includes local address, data and control buses (indicated by the various arrows shown in FIG. 2) that interconnect the microprocessor 48, the coprocessors 50, 52, the caches 62A, 62B, the data flow and ECC controller 58 and the memory and bus controller 60. These buses are used for local cycles such as POST ROM 56 reads, coprocessor cycles and cache read hits. Access to the POST ROM 56 can be accomplished via operation of the data flow and ECC controller 58. For global cycles such as cache writes, cache read misses, non-cacheable cycles, and I/O cycles, however, the processor subsystem 6 must complete its access off-board.

For off-board cycles, the memory and bus controller 60 decodes the local address and control signals and determines whether the access is destined for the processor bus 16 or for the dedicated memory. For a memory cycle, the memory and bus controller 60 generates the memory control signals (i.e., RAS, CAS and WE) and addresses to access the memory card. The memory and bus controller 60 also generates refresh signals to the memory card, e.g., element 10, for each refresh period. In conjunction with the memory bus controller 60, the data flow and ECC controller 58 also performs error checking and correction. Error checking and correction is described in detail in co-pending U.S. patent applications, Ser. No. 516,628 entitled "Digital Computer Having An Error Correction Code (ECC) System With Comparator Integrated Into Re-Encoder", Ser. No. 516,894 entitled "Minimized Error Correction Bad Bit Decoder", and Ser. No. 516,606 entitled "Shared Logic For Error Correction Syndrome Encoding", all filed on Apr. 30, 1990, all assigned to the assignee of this invention, and incorporated herein by reference.

For off-board cycles that are not destined for the memory card 10, the memory and bus controller 60 generates a processor bus request signal and takes control of the processor bus 16 when it is granted. Again, working in conjunction with the data flow and ECC controller 58, the memory and bus controller 60 completes the access to the processor bus 16.

Figure 3:
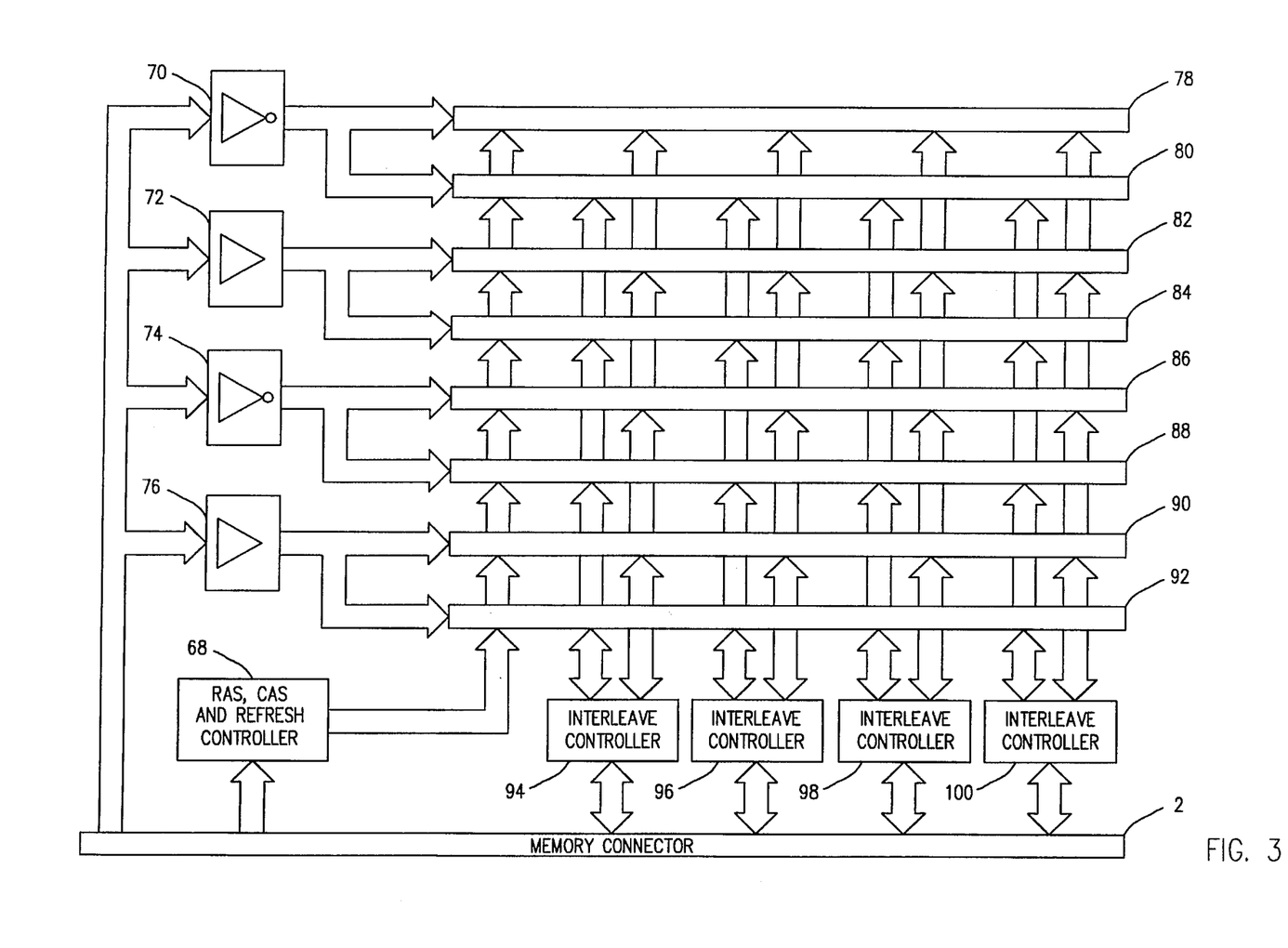
FIG. 3 is a block diagram of a memory subsystem such as could be employed in the computer system of FIG. 1.

Referring now to FIG. 3, a block diagram of the major components of the memory card 10 is set forth therein. With reference to FIG. 1, the memory card 10 interfaces to the rest of the system through the memory conductor 2. As discussed above, each memory card 10 preferably implements storage of virtual 64 bit words in the form of 2 interleaved banks of 32 bit double words, one odd and one even. Each card 10 includes a RAS, CAS, and refresh controller 68, four address buffers 70, 72, 74, 76, eight single in-line memory (SIMM) slots 78, 80, 82, 84, 86, 88, 90, 92, and four interleave controllers 94, 96, 98, 100. The RAS, CAS, and refresh controller 68, which is described in greater detail in co-pending U.S. patent application Ser. No. 07/540,049, entitled "A Digital Computer Having a System for Sequentially Refreshing an Expandable Dynamic RAM Memory Circuit" filed Jun. 19, 1990, assigned to the Assignee of this invention and hereby incorporated by reference, receives control signals from the memory interface 102 (See FIG. 1), and is driven by the memory and bus controller 60 (see FIG. 2). In turn, the RAS, CAS and refresh controller 68 drives control signals to the SIMM slots 68, 80, 82, 84, 86, 88, 90, 92 for reads, writes and refreshes. Each of the four interleave controllers 94, 96, 98, 100 which are described in greater detail in co-pending U.S. patent application, Ser. No. 07/530,137, entitled, "Dual Path Memory Retrieval System for an Interleaved Dynamic RAM Memory Unit", filed May 25, 1990, assigned to the Assignee of this invention, and hereby incorporated by reference, multiplexes eight bits of data between the memory connector 2 and the SIMM slots 78, 80, 82, 84, 86, 88, 90, 92.

As will be explained in greater detail below, the data is split between even and odd banks of 32 bits of data in order to accomplish true interleaving. That is, for each read, 64-bits of data is accessed, and the four interleave controllers 94, 96, 98, 100 select 32-bit (either even or odd data) for the current access. A subsequent access can be completed in a single processor clock cycle because the second 32-bit double word is already accessed and latched.

As previously mentioned, the memory card 10 includes address buffers 70, 72, 74, 76 and SIMM slots 78, 80, 82, 84, 86, 88, 90, 92. By way of example only, Model 74FCT828 and 74FCT827 data buffers manufactured by VTC could be used as the address buffers 70, 72, 74, 76. Inverting (74FCT828's) and non-inverting (74FCT827's) buffers are used to minimize the average address line signal switching to minimize electrical noise. The SIMM slots 78, 80, 82, 84, 86, 88, 90, 92 can be adapted to accommodate either 1, 2, 4 or 8 Mbyte SIMMs with parity or ECC organization. Before describing the data interface and data routing techniques which permit the routing of data between an I/O device and a mismatched processor bus or between a pair of mismatched I/O devices, certain definitional characteristics of the computer system illustrated in FIGS. 1–3 must first be set out.

The computer system herein described processes information in units of 32 bit blocks of data where each bit represents the equivalent of a logical "1" or a logical "0". Hereafter, each 32 bit unit of data shall be referred to as a data "word". Similarly, a block of 16 bits of data shall be hereafter referred to as a "half word" and a block of 8 bits of data shall hereafter be referred to as a "byte". Thus, each 32 bit word is comprised of two half words, each of which are comprised of two bytes. Again for definitional purposes only, the bytes and half words which comprise each 32 bit shall hereafter be referred to in accordance with the following:

| 32 BIT WORD | | | |
|---|---|---|---|
| HALF WORD 1 | | HALF WORD 0 | |
| BYTE 3 | BYTE 2 | BYTE 1 | BYTE 0 |
| bit 31-24 | bit 23-16 | bit 15-8 | bit 7-0 |

As previously discussed, the processor subsystems 6, 8, the memory subsystems 10, 12, the memory connectors 2, 4 and the processor bus 16 are all configured to process data in 32 bit words. However, I/O devices typically do not process data in 32 bit units. Rather, I/O devices most commonly process data in 8 or 16 units. For 16 bit I/O devices, data transfers occur during half word 0. For 8 bit I/O devices, data transfers occur during byte 0.

Figure 4:
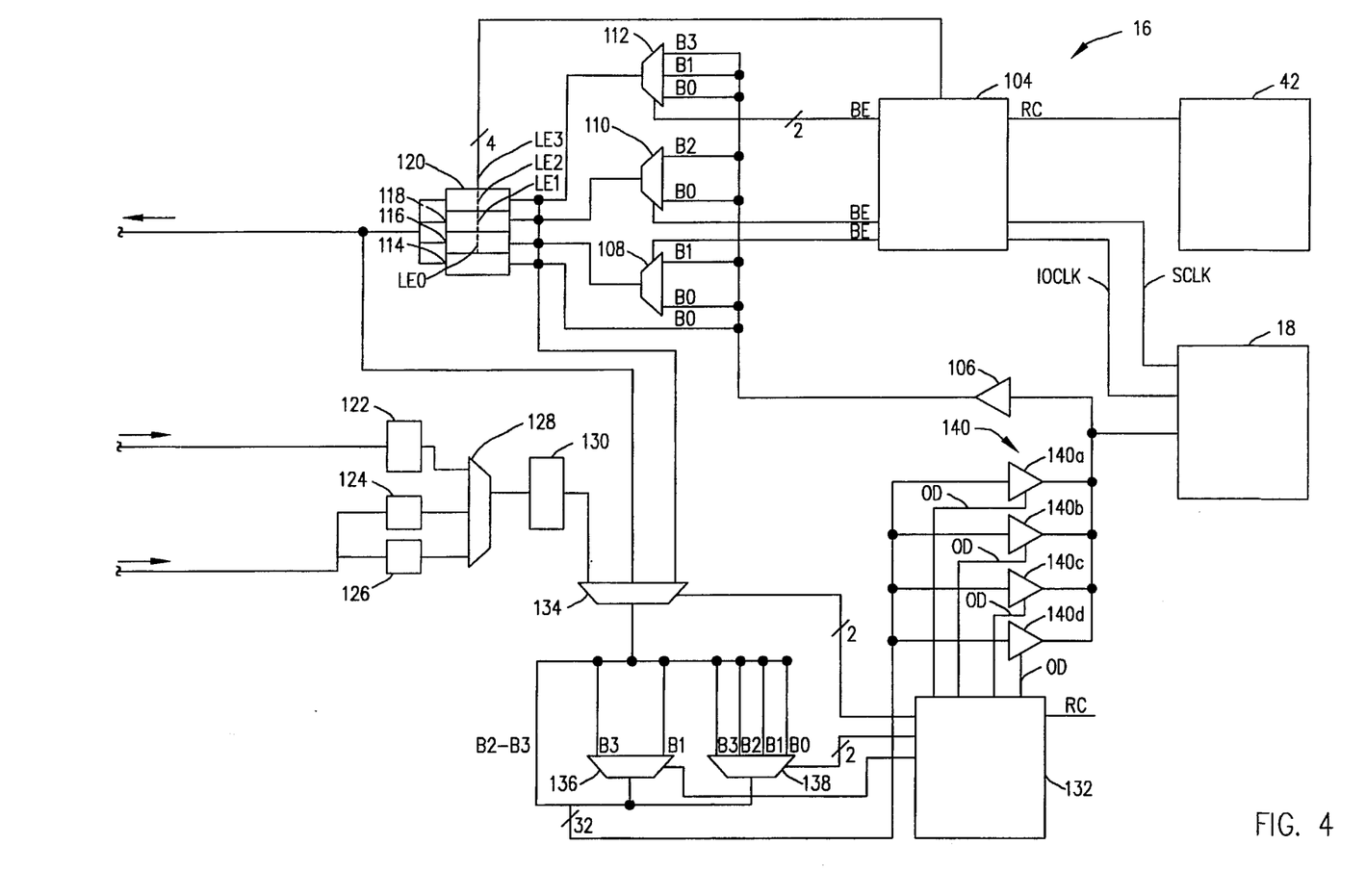
FIG. 4 is a block diagram of the interface between the processor bus of the computer system of FIG. 1 and an I/O device.

For a complete understanding of the present invention, the concept of a "Byte Enable" signal must also be discussed. It is contemplated that 32 bit words, 16 bit half words and 8 bit bytes are to be transferred between the I/O devices and the processor bus 16. To do so, the present invention controls the routing of each byte of data, whether the byte is the unit of data itself or a component of a larger block of data such as a half word or a word. Accordingly, the transfer of each byte within a word or other unit must be controlled. As is to be more fully described below, the transfer of data bytes is controlled by a series of signals referred to as "byte enable" signals. If the byte enable signal for a particular byte is asserted, that byte is then transferred by the particular circuitry to which the byte enable signal is asserted. Accordingly, for each data byte B0, B1, B2 and B3, there is a corresponding byte enable signal BE0, BE1, BE2 and BE3 which, upon assertion to the appropriate circuitry, will control the transfer of the corresponding data byte. Referring now to FIG. 4, the interfacing means and data routing techniques which permit the transfer of data between the 32 bit processor bus 16 (or matched computer components such as the processor 6 or the processor 8 connected thereto) and an I/O device configured to process data only in 8, 16, or 32 bit units is now described in detail. As is more fully described in co-pending U.S. patent application, Ser. No. 490,003 entitled "Method and Apparatus for Performing Multi-Master Bus Pipelining", filed Mar. 7, 1990, assigned to the Assignee of this invention, and hereby incorporated by reference, the processor subsystem 6 and the processor subsystem 8 are each capable of serving as a bus master to control the transfer of information to and from a slave device such as the I/O device 18 via the processor bus 16. As is also described in the aforementioned patent application, while both the processor subsystem 6 and the processor subsystem 8 can be performing computations simultaneously, only one can be a bus master at a time. To become the bus master, the processor subsystem 6 or 8 must request the processor bus 16 and be granted access to the processor bus 16 to become the bus master. The processor 6, 8 must then complete the intended transaction and relinquish the bus.

As is further described in the above-referenced patent application, the system and bus controller 42 includes an arbiter that arbitrates between two or more requesting processors such as the processor subsystem 6 and the processor subsystem 8 if both processors request the processor bus 16 at the same time and grants the bus to one of the requesting processor subsystems. The selected processor subsystem will thereafter move from a requesting state to a selected address master state, when the current bus master releases the address lines of the bus. The selected address master then addresses the slave device, for example the I/O device 18, to set up a transfer of data. At this same time, the current bus master becomes the current data master and data is transferred to the location previously addressed. When the current data master indicates that it is releasing the data lines of the bus, the selected address master becomes the selected bus master while the current data master transfers from the bus into an idle state. It is evident, therefore, that the current master is the data master while the selected master is the address master. In the case where there are only two possible master devices, there is no arbitration because one of the devices will always be a master device with no need to arbitrate. However, in the preferred embodiment, the arbiter is still used to generate a bus grant signal to the requesting device.

Referring again to FIG. 4, the interface between computer subsystems and/or I/O devices and the techniques for routing data between such subsystems and/or I/O devices which is the subject of the present invention shall now be described. More specifically, the data interface and the routing of data from a mismatched I/O device 18 configured to process either 8, 16, 24, or 32 bits (1, 2, 3 or 4 bytes) to the 32 bit (4 byte) processor bus 16 will now be described in greater detail.

During a processor read cycle, data is to be transferred from the slave I/O device 18 to the master data processor subsystem 6 via the processor bus 16. During such a cycle, the slave I/O device 18 transmits data units of a size corresponding to its width from the slave I/O device 18 to first, second and third input byte swap multiplexers (or "IS multiplexers") 108, 110, 112, respectively, and a input latch (or "IL") 114. Depending on the width of the I/O device, each data unit will be comprised of 8, 16 or 32 bits wherein each group of bits 0–7 is hereafter referred to as a "first byte", each group of bits 8–15 is a "second byte", each group of bits 16–23 is a "third byte" and each group of bits 24–31 is a "fourth byte".

Each of the IS multiplexers 108, 110, 112 is connected to output driver means 106 such that each IS multiplexer 108, 110, 112 receives each group of bits output by the slave I/O device 18 which correspond to a plural number of the above designated byte groupings. More specifically, IS multiplexer 108 is configured to receive each group of data bits output from the slave I/O device which has been designated as first byte B0 and each group of output data bits designated as second byte B1. The IS multiplexer 110 is configured to receive each group of data bits which has been designated as the first byte B0 and a third byte B2. Finally, IS multiplexer 112 is configured to receive each group of data bits which has been designated as the first byte group B0, the second byte group B1 and the fourth byte group B3.

While each IS multiplexer 108, 110,112 is configured to receive plural byte groups, only one of the input byte groups is selected by the particular multiplexer for output. The selection of the input byte group for output by each multiplexer is controlled by a series of routing codes (or "RC"'s) generated by the system and bus controller 42 and then transmitted to a first routing code decoder 104. The first routing code decoder 104 decodes the RC transmitted by the system and bus controller 42 and, depending on the particular RC received, transmits either a byte enable signal BE0 or a byte enable signal BE1 to IS multiplexer 108 for selecting either B0 or B1 for output, either byte enable signal BE0 or byte enable signal BE2 to IS multiplexer 110 for selecting either B0 or B2 for output and either byte enable signal BE0 and byte enable signal BE1 or byte enable signal BE3 to the IS multiplexer 112 for selecting either B0, B1 or B3 for output. Such data transfer signals generated by the first action code decoder are synchronized with the IOCLK signal from the I/O device 18 and a timed utility SCLK input from the I/O device 18.

As the input latch 114 input is directly connected to the output driver means 106 and the input latches 116, 118 and 120 inputs are connected to the IS multiplexer 108, 110, and 112 outputs, respectively, a combination of bytes B0, B1, B2 and B3 controlled by the RCs generated by the system and bus controller 42 will be supplied to the inputs of input latches 114, 116, 118 and 120, respectively. The system and bus controller 42 also generates latch enable signals LE0, LE1, LE2, LE3 and LE4 to latches 114, 116, 118, and 120, respectively, to latch the particular combination of bytes B0, B1, B2 and B3 supplied to the inputs of the latches 114, 116, 118 and 120 to the outputs of the latches. By latching the outputs, a 32 bit (4 byte) data word is accumulated at the output of the input latches 114,116,118 and 120 for transmission to the processor 6.

The routing codes generated by the system and bus controller 42 to control the processor read operation, as well as any other data transfer from a slave I/O device to a 32 bit computer subsystem connected to the processor bus 16, are as set forth in Table 1 below:

TABLE 1

| CYCLE | RC | IS 112 | IS 110 | IS 108 | IL 120 | IL 118 | IL 116 | IL 114 |
|---|---|---|---|---|---|---|---|---|
| [ ]-<< > | 04 | x | x | x | | | | |
| [0]-<<0> | 05 | x | x | x | | | | T |
| [1]-<<0> | 01 | x | x | B0 | | | T | |
| [2]-<<0> | 03 | x | B0 | x | | T | | |
| [3]-<<0> | 02 | B0 | x | x | T | | | |
| [0,1]-<<0,1> | 07 | x | x | B1 | | | T | T |
| [2,3]-<<0,1> | 06 | B1 | B0 | x | T | T | | |
| [0,1,2,3]-<<0,1,2,3> | 00 | B3 | B2 | B1 | T | T | T | T | where:

| | |
|---|---|
| < > = | byte locations on the processor bus; |
| [ ] = | byte locations on the input latch; |
| -< = | direction of byte swap between the processor bus and the latches; |
| B0, B1, B2, B3 = | data unit transmitted by designated IS multiplexer upon receipt of corresponding byte enable signal BE0, BE1, BE2, BE3; and |
| T = | latch enable signal transmitted to the designated latch. |

When the data interface is inactive, i.e. no data is being transferred, the system bus controller 42 generates routing code "04". Routing code 04 neither enables the IS multiplexers 108, 110, or 112 nor the IL latches 114, 116, 118 or 120. The system is inactive and no byte swapping occurs.

When an 8 bit slave device is supplying data to the 32 bit processor bus 16 (and connected computer subsystem), the system and bus controller 42 generates 4 sub-cycles during each cycle of the processor bus 16 by sequentially generating routing codes "05", "01", "03" and "02". As may be seen from the table above, each generated subcycle controls the latching of the first byte 0 output by the I/O device to byte 0 of the processor bus 16. The second byte 0 output by the I/O device is latched to byte 1 of the processor bus 16, the third byte 0 to byte 2 and the fourth byte 0 to byte 3.

More specifically, when an 8 bit slave I/O is utilized, a single byte from the I/O device 14 is input to the driver means 106. The output from the driver means 106 is connected directly to the latch 114 and to the B0 inputs of the IS multiplexers 108, 110, and 112, respectively. During the first I/O subcycle (RC=05), the routing code decoder 104 supplies an enabling signal to the input latch 114, thereby latching the output of the I/O to the latch 114 and placing byte 0 of the I/O device 18 into byte 0 of the processor bus. During the second I/O subcycle (RC=01), the routing code decoder 104 supplies a byte enabling signal to the IS multiplexer 108 which switches the output of the IS multiplexer 108 to the B0 input and supplies an enabling signal to the input latch 116, thereby latching the output of the I/O device 18 during the second subcycle to the latch 116 and placing the next byte 0 of the I/O device 18 into byte 1 of the processor bus. Similarly, during the third I/O subcycle (RC=03), routing code decoder 104 supplies a byte enable signal to the IS multiplexer 110 and an enabling signal to the input latch 118 during the third I/O subcycle to latch the latch 118 to the third subcycle I/O device output and place the next byte 0 from the I/O device 18 into byte 2 of the processor bus. Finally, during the fourth I/O subcycle (RC= 02), the routing code decoder 104 supplies a byte enable signal to the IS multiplexer 112 and an enabling signal to the input latch 120, thereby latching the input latch 120 to the fourth I/O subcycle output and placing the next byte 0 from the I/O device 18 into byte 3 of the processor bus. When a 16 bit I/O device is connected to the processor bus, no additional circuitry is required to match the 16 bit subsystem with the 32 bit data bus. A 16 bit I/O device will have two I/O subcycles during the processor bus cycle. In such a configuration, the system and bus controller 42 generates and transmits to the routing code decoder 104, a first routing code during the first I/O subcycle and a second routing code during the second I/O subcycle. During the first I/O subcycle (RC=07), a byte enable signal is transmitted to the IS multiplexer 108 and latch enable signals are transmitted to the latches 114, 116. Thus, byte B0 of the first half word output by the I/O device 18 is latched by the latch 114 and byte B1 of the first half word output by the I/O device 18 is provided at the B1 input of the IS multiplexer 108, where, upon receipt of the BE1 signal, the IS multiplexer 108 outputs byte B1 towards the latch 116 for latching. A second half word is transmitted by the I/O device 18 and latched to the upper bytes of the processor word during the second I/O subcycle (RC=06). During the second I/O subcycle, the byte B0 is output to the input of the latch 114 and the B0 input of the IS multiplexers 110 and 112. During this period, the routing code decoder 104 generates a byte enable signal BE to the IS multiplexer 110, thereby switching the multiplexer such that byte B0 is provided at the output of the IS multiplexer 110. The routing code decoder 104 also transmits a latch enable signal LE2 to the latch 118, thereby latching the output of the latch 118 to the byte B0. During the second half of the second subcycle, the I/O device 18 transmits byte B1 to the B1 inputs of the IS multiplexers 108, 112. During the second half of the second subcycle, the routing code decoder 104 transmits the byte enable signal BE1 to the IS multiplexer 112, thereby switching the multiplexer such that byte B1 is provided at the output of the IS multiplexer 112. The routing code decoder also transmits a latch enable signal LE3 to the latch 120, thereby latching the output of the latch 120 to byte B1.

When a 32 bit (4 byte) I/O device 18 is connected to the processor bus 16, the I/O device and the processor bus 16 are matched and the routing codes must again be changed to modify the steering of the 32 bit output from the I/O device 18. Again, no additional circuitry is necessary. In the matched configuration, the routing code generating means of the system and bus controller 42 generates and transmits to the routing code decoder 104, a single routing code RC=00. During data transmission, the byte B0 is supplied to the latch 114 and the B0 inputs of IS multiplexers 108, 110 and 112. The byte B1 is supplied to the B1 inputs of the IS multiplexers 108 and 112, the byte B2 to the B2 input of the IS multiplexer 110 and the byte B3 to the B3 input of the IS multiplexer 112. The routing code decoder 104 transmits the byte enable signal BE1 to the IS multiplexer 108, the byte enable signal BE2 to the IS multiplexer 110 and the byte enable signal BE3 to the IS multiplexer 112, thereby switching the IS multiplexers 108,110, and 112 such that the bytes B1, B2 and B3 are provided at the outputs of the IS multiplexer 108, 110 and 112, respectively. The routing code decoder 104 also transmits a latch enable signal LE0 to the latch 114, LE1 to the latch 116, LE2 to the latch 118 and LE3 to the latch 120, thereby latching the output of the latches 114, 116, 118 and 120 to bytes B0, B1, B2 and B3, respectively.

Having described the routing of data from a I/O device 18 to the processor bus 16, which in turn will transfer the data to a computer subsystem such as processor subsystem 6, the routing of data from the processor bus 16 to the I/O device 18 will now be described. During a write operation, data from the processor subsystem 6 is input to a latch 122. As the memory system 10 is interleaved, data from the memory 10 is provided to an even latch 124 and an odd latch 126 during a write from memory operation. Once enabled by respective latch enable signals (not shown) transmitted by the system and bus controller 42, the outputs from data latches 122, 124, and 126 are provided as respective inputs to a multiplexer 128. Depending on the type of write operation being conducted, a switching signal is input to the multiplexer to switch the multiplexer 128 such that either data from the memory subsystem 10 or the processor subsystem 6 is output to the input of a latch 130.

During respective memory or processor write operations, a latch enable signal (not shown) is provided to the latch 130 to latch the output to the data from the memory subsystem 10 or the processor subsystem 6 to a first input of a multiplexer 134. A second routing code decoder 132 then transmits a switching signal to the multiplexer 134 to switch the output of the multiplexer 134 to the input connected to the latch 130. In such a manner, the multiplexer 134 outputs the 32 bit data word to be transferred from either the processor or subsystem 6 or the memory subsystem 10 to the I/O device 18 having a data width of either 8, 16 or 32 bits. To do so, the output of multiplexer 134 is connected to a first output byte swap ("OS") multiplexer 136 and a second OS multiplexer 138. Byte B0 is provided as a first input to the OS multiplexer 138, byte B1 as a second input to the OS multiplexer 138 and a first input to the OS multiplexer 136, byte B2 as a third input to the OS multiplexer 138 and as a first input to output driver means 140, which may include first, second, third and fourth output drivers 140a, 140b, 140c and 140d, and byte B3 as a fourth input to the OS multiplexer 138, a second input to the OS multiplexer 136 and as a second input to the output driver means 140a–d. The outputs of the OS multiplexers 136, 138 are input to the output driver means 140a–d as well.

The second routing code decoder 132 receives RC signals from the system and bus controller 42 and, in turn, transmits byte enable signals BE0-BE3 to the OS multiplexer 138, byte enable signals BE1 and BE3 to the OS multiplexer 136 and enabling signals OD to the output driver means 140a–d as required to accomplish the byte swapping required for a particular write operation, e.g., a 32 bit computer subsystem to either an 8, 16 or 32 bit I/O device. The routing codes, byte enable signals and output driver enable signals which will successfully complete the various write operations noted are as set forth in Table 2 below:

TABLE 2

| CYCLE | RC | OS | | OD | | | |
|---|---|---|---|---|---|---|---|
| | | 136 | 138 | 140d | 140c | 140b | 140a |
| (0,1,2,3)→<0,1,2,3> | 00 | B1 | B0 | T | T | T | T |
| (2,3)→<0,1> | 03 | B3 | B2 | T | T | T | T |
| (1)→<0,1> | 02 | B1 | B1 | T | T | T | T |
| (3)→<0,1> | 01 | B3 | B3 | T | T | T | T | where:

| ( ) = | byte locations on the subsystem connected to the processor bus; |
| < > = | byte locations on the processor bus; |
| → = | direction of byte swap between processor bus, latch or device; |
| B0, B1 B2, B3 = | data unit transmitted by the designated OS multiplexer upon receipt of corresponding byte enable signal BE0, BE1, BE2, BE3; and |
| T = | driver enable signal transmitted to the designated output driver. |

Having completed a discussion of the routing of data between an 8, 16 and 32 bit I/O device and a 32 bit computer subsystem connected to the 32 bit processor bus 16, particular attention will now be directed to the necessary modifications to the techniques described herein to route data between a pair of 8, 16 or 32 bit I/O devices via the processor bus 16. In an I/O to I/O transfer, one I/O must be designated the I/O bus master and the other the I/O bus slave. To route data between slave and master I/O's, the data is first transferred from the slave I/O device 18 to the processor bus 16 and then to the master I/O device 14. During such a transfer, the slave I/O device 18 transmits data units of a size corresponding to its width from the slave I/O device 18 to the first, second and third IS multiplexers 108, 110, 112, respectively, and the IL latch 114. Depending on the width of the I/O device, each data unit will be comprised of 8, 16 or 32 bits wherein each group of bits 0–7 is a first byte, each group of bits 8–15 is a second byte, each group of bits 16–23 is a third byte and each group of bits 24–31 is a fourth byte.

Each of the IS multiplexers 108,110,112 are connected to output driver means 106 such that each IS multiplexer 108, 110, 112 receives each group of bits output by the slave I/O device 18 which correspond to a plural number of the above designated byte groupings. More specifically, IS multiplexer 108 is configured to receive each group of data bits output from the slave I/O device 18 which has been designated as first byte B0 and each group of output data bits designated as second byte B1. The IS multiplexer 110 is configured to receive each group of data bits which has been designated as the first byte B0 or a third byte B2. Finally, the IS multiplexer 112 is configured to receive each group of data bits which has been designated as the first byte group B0, the second byte group B1 and the fourth byte group B3.

While each IS multiplexer 108, 110,112 is configured to receive plural byte groups, only one of the input byte groups is selected by the particular multiplexer for output. The selection of the input byte group for output by each multiplexer is controlled by a series of routing codes (or "RC"s) generated by the system and bus controller 42 and then transmitted to a first routing code decoder 104. The first routing code decoder 104 decodes the RC transmitted by the system and bus controller 42 and, depending on the particular RC received, transmits either a byte enable signal BE0 or a byte enable signal BE1 to IS multiplexer 108 for selecting either B0 or B1 for output, either byte enable signal BE0 or byte enable signal BE2 to IS multiplexer 110 for selecting either B0 or B2 for output and either byte enable signal BE0 and byte enable signal BE1 or byte enable signal BE3 to the IS multiplexer 112 for selecting either B0, B1 or B3 for output. Such data transfer signals generated by the first routing code decoder are synchronized with the IOCLK signal from the slave I/O device 18 and the timed utility SCLK input from the slave I/O device 18. As the input latch 114 input is directly connected to the output driver means 106 and the input latch 116, 118 and 120 inputs are connected to the IS multiplexer 108, 110, and 112 outputs, respectively, a combination of bytes B0, B1, B2 and B3 controlled by the RCs generated by the system and bus controller 42 will be supplied to the inputs of input latches 114, 116, 118 and 120, respectively. The system and bus controller 42 also generates latch enable signals LE1, LE2, LE3 and LE4 to latches 114, 116, 118, and 120, respectively, to latch the particular combination of bytes B0, B1, B2 and B3 supplied to the inputs of the latches 114, 116, 118 and 120 to the outputs of the latches.

The routing codes generated by the system and bus controller 42 to control the transfer of data from the slave I/O device 18 to the 32 bit processor bus 16 as part of the eventual transfer of data from the slave I/O device 18 to the master I/O device 14 are as set forth in Table 3 below:

TABLE 3

| CYCLE | RC | IS | | | IL | | | |
|---|---|---|---|---|---|---|---|---|
| | | 112 | 110 | 108 | 120 | 118 | 116 | 114 |
| [0 ]–<<0> | 15 | x | x | x | | | | T |
| [1]–<<0> | 11 | x | x | B0 | | | T | |
| [2]–<<0> | 13 | x | B0 | x | | T | | |
| [3]–<<0> | 12 | B0 | x | x | T | | | |
| [0,1]–<<0,1> | 17 | x | x | B1 | | | T | T |
| [2,3]–<<0,1> | 16 | B1 | B0 | x | T | T | | |
| [0,1,2,3]–<<0,1,2,3> | 10 | B3 | B2 | B1 | T | T | T | T | where:

| < > = | byte locations on the processor bus; |
|---|---|
| [ ] = | byte locations on the input latch; |
| –< = | direction of byte swap between the processor bus and the latches; |
| B0, B1, B2, B3 = | data unit transmitted by designated IS multiplexer upon receipt of corresponding byte enable signal BE0, BE1, BE2, BE3; and |
| T = | latch enable signal transmitted to the designated latch. |

When an 8 bit slave device is supplying data to the 32 bit processor bus 16 as part of the transfer to the master slave device, the system and bus controller 42 generates 4 subcycles during each cycle of the processor bus 16 by sequentially generating routing codes "15", "11", "13" and "12". As may be seen, from the table above, each generated subcycle controls the latching of the first byte 0 output by the slave I/O device 18 to byte 0 of the processor bus 16. The second byte 0 output by the slave I/O device 18 is latched to byte 1 of the processor bus 16, the third byte 0 to byte 2 and the fourth byte 0 to byte 3.

More specifically, when an 8 bit slave I/O device is utilized, a single byte from the slave I/O device 18 is input to the driver means 106. The output from the driver means 106 is connected directly to the latch 114 and to the B0 inputs of the IS multiplexers 108, 110, and 112, respectively. During the first I/O subcycle (RC=15), the routing code decoder 104 supplies an enabling signal to the input latch 114, thereby latching the output of the slave I/O device 18 to the latch 114 and placing byte 0 of the slave I/O device 18 into byte 0 of the processor bus. During the second I/O subcycle (RC=11), the routing code decoder 104 supplies a byte enabling signal to the IS multiplexer 108 which switches the output of the IS multiplexer 108 to the B0 input and supplies an enabling signal to the input latch 116, thereby latching the output of the slave I/O device 18 during the second subcycle to the latch 116 and placing the next byte 0 of the slave I/O device 18 into byte 1 of the processor bus. Similarly, during the third I/O subcycle (RC=13), routing code decoder 104 supplies a byte enable signal to the IS multiplexer 110 and an enabling signal to the input latch 118 during the third I/O subcycle to latch the latch 118 to the third subcycle I/O device output and place the next byte 0 from the slave I/O device 18 into byte 3 of the processor bus. Finally, during the fourth I/O subcycle (RC=12), the routing code decoder 104 supplies a byte enable signal to the IS multiplexer 112 and an enabling signal to the input latch 120, thereby latching the input latch 120 to the fourth I/O subcycle output and placing the next byte 0 from the slave I/O device 18 into byte 0 of the processor bus.

When a 16 bit slave I/O device is supplying data to the 32 bit processor bus 16 as part of the transfer to the master I/O device. 18, the 16 bit slave I/O device will have two I/O subcycles during the slave I/O device to processor bus 16 transfer. In such a configuration, the system and bus controller 42 generates and transmits to the routing code decoder 104, a first routing code during the first I/O subcycle and a second routing code during the second I/O subcycle. During the first I/O subcycle (RC=17), a byte enable signal is transmitted to the IS multiplexer 108 and latch enable signals are transmitted to the latches 114,116. Thus, byte B0 of the first half word output by the slave I/O device 18 is latched by the latch 114 and byte B1 of the first half word output by the slave I/O device 18 is provided at the B1 input of the IS multiplexer 108, where, upon receipt of the BE1 signal, the IS multiplexer 108 outputs byte B1 towards the latch 116 for latching. A second half word is transmitted by the slave I/O device 18 and latched to the upper bytes of the processor word during the second I/O subcycle (RC=16). During the second I/O subcycle, the byte B0 is output to the input of the latch 114 and the B0 input of the IS multiplexers 110 and 112. During this period, the routing code decoder 104 generates a byte enable signal BE to IS multiplexer 110, thereby switching the multiplexer such that byte B0 is provided at the output of the IS multiplexer 110. The routing code decoder 104 also transmits a latch enable signal LE2 to the latch 118, thereby latching the output of the latch 118 to the byte B0. During the second half of the second subcycle, the slave I/O device 18 transmits byte B1 to the B1 inputs of the IS multiplexers 108, 112. During the second half of the second subcycle, the routing code decoder 104 transmits the byte enable signal BE1 to the IS multiplexer 112, thereby switching the multiplexer such that byte B1 is provided at the output of the IS multiplexer 112. The routing code decoder 104 also transmits a latch enable signal LE3 to the decoder 132 receives RC signals from the system and bus controller 42 in accordance with Table 4 below:

TABLE 4

| CYCLE | RC | IS/OM | | | OS | | OD | | | |
|---|---|---|---|---|---|---|---|---|---|---|
| | | 112 | 110 | 108 | 136 | 138 | 140d | 140c | 140b | 140a |
| <0> <1,2,3> | 35 | B0 | B0 | B0 | x | x | T | T | T | |
| <0,1> <2,3> | 33 | B1 | B0 | x | x | x | T | T | | T |
| <1> <0> | 24 | x | x | B1 | x | B1 | | | | T |
| <2> <0> | 26 | x | B2 | x | x | B2 | | | | T |
| <3> <0> | 27 | B3 | x | x | x | B3 | | | | T |
| <2,3> <0,1> | 31 | B3 | B2 | x | B3 | B2 | | | T | T | latch 120, thereby latching the output of the latch 120 to byte B1.

When a 32 bit (4 byte) slave I/O device 18 is connected to the processor bus 16 for the slave I/O device to master I/O device data transfer, the I/O device and the processor bus 16 are matched and the routing codes must again be changed to modify the steering of the 32 bit output from the slave I/O device. In the matched configuration, the routing code generating means of the system and bus controller 42 generates and transmits to the routing code decoder 104, a single routing code RC=10. During data transmission, the byte B0 is supplied to the latch 114 and the B0 inputs of IS multiplexers 108, 110 and 112. The byte B1 is supplied to the B1 inputs of the IS multiplexers 108 and 112, the byte B2 to the B2 input of the IS multiplexer 110 and the byte B3 to the B3 input of the IS multiplexer 112. The routing code decoder transmits the byte enable signal BE1 to the IS multiplexer 108, the byte enable signal BE2 to the IS multiplexer 110 and the byte enable signal BE3 to the IS multiplexer 112, thereby switching the IS multiplexers 108, 110, and 112 such that the bytes B1, B2 and B3 are provided at the outputs of the IS multiplexer 108, 110 and 112, respectively. The routing code decoder 104 also transmits a latch enable signal LE0 to the latch 114, LE1 to the latch 116, LE2 to the latch 118 and LE3 to the latch 1 b, thereby routing the output of the latches 114,116, 118 and 120 to bytes B0, B1, B2 and B3, respectively.

Having described the routing of data from the slave I/O device 18 to the processor bus 16 during the slave I/O device to master I/O device data transfer being described, the routing of data from the processor bus 16 to the master I/O device 14 will now be described. The routing of data from the processor bus 16 to the master I/O device 14 differs significantly from the previously described routing techniques. Here, depending on the particular byte swapping required for the desired transfer to the master I/O device 14, data transferred to the processor bus 16 will be routed from both the latched and unlatched sides of the input latches 114, 116,118, 120 by connecting the inputs of the latches 114, 116,118 120 to a second input of the multiplexer 134 and the outputs of the latches 114,116,118, 120 to a third input of the multiplexer 134. During the routing of data to the master I/O device 14, the second routing code decoder 132 will select either latched or unlatched data for routing by transmitting a switching signal to the multiplexer 134 to connect the output of the multiplexer 134 to either the latched or unlatched data. The routing of data output by the multiplexer 134 to the master I/O device 14 will then proceed separately for the latched and unlatched data.

For the transfer of unlatched data from the processor bus 16 to the master I/O device 14, the second routing code where:

TABLE 4

| | |
|---|---|
| < > = | byte locations on processor bus; |
| -< = | direction of byte swap between processor bus, latch or device; |
| B0, B1 B2, B3 = | data unit transmitted by designated IS and/or OS multiplexers upon receipt of corresponding byte enable signal BE0, BE1, BE2, BE3; and |
| T = | latch enable signal transmitted to the designated latch. |

As the output of multiplexer 134 is connected to the first OS multiplexer 136 and the second OS multiplexer 138, byte B0 is provided as a first input to the OS multiplexer 138, byte B1 as a second input to the OS multiplexer 138 and a first input to the OS multiplexer 136, byte B2 as a third input to the OS multiplexer 138 and as a first input to output driver means 140 and which may include first, second, third and fourth output drivers 140a, 140b, 140c and 140d, and byte B3 as a fourth input to the OS multiplexer 138, a second input to the OS multiplexer 136 and as a second input to the output driver means 140a–d. The outputs of the OS multiplexers 136, 138 are input to the output driver means 140a–d as well.

In response to the RC signals received from the system and bus controller 42, the second routing code decoder 132 transmits byte enable signals BE0 to the IS multiplexers 108, 110, 112, BE1 to the IS multiplexers 108 and 112, BE2 to the IS multiplexer 110 and BE3 to the IS multiplexer 112 so that the desired unlatched data will be input via the multiplexer 134 to the OS multiplexers 136,138. The second routing code decoder 132 further transmits byte enable signals BE1, BE2 and BE3 to the OS multiplexer 136, byte enable signal BE3 to OS multiplexer 138 and output driver enabling signals ODE to the output drivers 140a, 140b, 140c and 140d to accomplish the byte swapping required for a transfer from the unlatched side of the latches 114, 116, 118 and 120 for the particular data transfer, e.g., either an 8, 16 or 32 bit slave I/O device 18 to either an 8, 16 or 32 bit master I/O device 14 desired.

For transfers of latched data from the processor bus 16 to the master I/O device 14, the second routing code decoder 132 receives RC signals from the system and bus controller 42 in accordance with Table 1 below:

TABLE 5

| CYCLE | RC | OS 136 | OS 138 | OD 140d | OD 140c | OD 140b | OD 140a |
|---|---|---|---|---|---|---|---|
| [0,1,2,3]<br><0,1,2,3> | 37 | B1 | B0 | T | T | T | T |
| [2,3]→<0,1> | 33 | B3 | B2 | | | T | T |
| [2,3]→<2,3> | 32 | x | x | T | T | | |
| [1,2,3]<br><1,2,3> | 34 | B1 | x | T | T | T | |
| [3]→<0> | 22 | x | B3 | | | | T |
| [2]→<0> | 23 | x | B2 | | | | T |
| [1]→<0> | 21 | x | B1 | | | | T | where:

| | | |
|---|---|---|
| < > | = | byte locations on the processor bus; |
| [ ] | = | byte locations on the input latch; |
| | = | direction of byte swap between the processor bus, latch or subsystem; |
| B0, B1 B2, B3 | = | data unit transmitted by designated OS multiplexer upon receipt of corresponding byte enable signal BE0, BE1, BE2, BE3; and byte enable signal transmitted to the designated OS; and |
| T | = | latch enable signal transmitted to the output driver. |

Similarly, as the output of the multiplexer 134 is connected to the first OS multiplexer 136 and the second OS multiplexer 138, byte B0 is provided as the first input to the OS multiplexer 138, byte B1 as the second input to the OS multiplexer 138 and the first input to the OS multiplexer 136, byte B2 as the third input to the OS multiplexer 138 and as the first input to output driver means 140 and which may include first, second, third and fourth output drivers 140a, 140b, 140c and 140d, and byte B3 as the fourth input to the OS multiplexer 138, the second input to the OS multiplexer 136 and as the second input to the output driver means 140a–d. The outputs of the OS multiplexers 136, 138 are input to the output driver means 140a–d as well.

In response to the RC signals received from the system and bus controller 42, the second routing code decoder 132 transmits byte enable signals BE1 and BE3 to the OS multiplexer 136, byte enable signals BE0, BE1, BE2 and BE3 to the OS multiplexer 138 and output driver enabling signals OD to the output driver means 140a–d as required to accomplish the byte swapping required for a transfer from the latched side of the latches 114, 116, 118 and 120 for the particular data transfer, e.g., either an 8, 16 or 32 bit slave I/O device 18 to either an 8, 16 or 32 bit master I/O device 14, desired.

As can be seen from the above description of the present invention, there is provided an interface between a 32 bit processor bus and an 8, 16 or 32 bit I/O device such that the same interface may be used for data transfers between an 8, 16, or 32 bit I/O device and a 32 bit computer system by modifying the routing of data bytes being transferred between the two. As can be further seen from the above description of the present invention, the same interface may be used for data transfers between a first 8, 16 or 32 bit I/O device and a second 8, 16 or 32 bit I/O device, again by modifying the routing of data bytes being transferred between the two. One interface is thus provided for the transfer of data between numerous combinations of mismatched, as well as matched, devices. However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. A digital computer system having a data interface for transferring fixed word, length data units output by an 8, 16 or 32 bit wide I/O device to a 32 bit wide data bus by accumulating said 8, 16 or 32 bit wide fixed word-length data units output by said I/O device into a 32 bit data word, comprising:

configurable first, second, third and fourth latches, each of said latches having an input and an output;

configurable means for separately routing a first, second, third and fourth data byte output from said I/O device to the input of said first, second third and fourth latches, respectively wherein said means further comprises means for selectively routing said first, second, third and fourth data byte outputs;

configurable means for accumulating said 32 bit data word from each of said latch output;

means for generating a code representing a fixed word-length data routing command said codes selectively configuring said latches routing means and accumulating means to route fixed word-length data as a function of data bus width, said code embodied as a set of bused signals generated by a bus controller to thereby permit devices communicating by buses of different width to communicate with each other without requiring circuitry other than said bus controller; and means for transmitting said accumulated 32 bit data word to said data bus.

2. A system as set forth in claim 1 wherein said means for selectively routing said first, second, third and fourth data byte outputs further comprises at least one multiplexer having multiple multiplexer inputs for receiving at least two of said first, second, third and fourth data bytes output by said I/O device and a single multiplexer output.

3. A system as set forth in claim 2 further comprising means for selecting any combination of said first, second, third and fourth data bytes input to said at least one multiplexer for transmission to said latches.

4. A digital computer system having a data interface for transferring fixed word-length data units output by an 8, 16 or 32 bit wide I/O device to a 32 bit wide data bus by accumulating said 8, 16 or 32 bit wide fixed word: length data units output by said I/O device into a 32 bit data word comprising:

configurable first, second, third and fourth latches, each of said latches having an input and an output:

configurable means for separately routing a first, second, third and fourth data byte output from said I/O device to the input of said first, second, third and fourth latches, respectively wherein said routing means further comprises:

a plurality of multiplexers, each said multiplexer having at least two inputs for receiving at least two of said first, second, third and fourth data bytes output by said I/O device and a single output connected to one of said first, second, third or fourth latches; and means for selectively controlling which of said first, second, third and fourth bytes output by said I/O device are input to each of said plurality of multiplexers;

configurable means for accumulating said 32 bit data word from each of said latch output;

means for generating a code representing a fixed word-length data routing command, said codes selectively configuring said latches, routing means and accumulating means to route fixed word-length data as a function of data bus width, said code embodied as a set of bused signals generated by a bus controller to thereby permit devices communicating by buses of different width to communicate with each other without requiring circuitry other than said bus controller; and means for transmitting said accumulated 32 bit data word to said data bus.

5. A system as set forth in claim 4 wherein said means for selectively controlling which of said first, second, third and fourth bytes output by said I/O device are input to each of said plurality of multiplexers further comprises means for transmitting a byte enable signal to each of said multiplexers, said byte enable signal selecting which of said first, second, third and fourth data bytes are input to said corresponding multiplexer.

6. A digital computer system having a data interface for transferring fixed word-length data units output by an 8, 16 or 32 bit wide I/O device to a 32 bit wide data bus by accumulating said 8, 16 or 32 bit wide fixed word-length data units output by said I/O device into a 32 bit data word, comprising:

configurable first, second, third and fourth latches, each of said latches having an input and an output;

configurable means for separately routing a first, second, third and fourth data byte output from said I/O device to the input of said first, second, third and fourth latches respectively wherein said means for separately routing further comprises:
means for connecting the output of said I/O device to the input of said first latch;
a first multiplexer having at least one input tied to the output of said I/O device and an output tied to the input of said second latch;
a second multiplexer having at least one input tied to the output of said I/O device and an output tied to the input of said third latch; and
a third multiplexer having at least one input tied to the output of said I/O device and an output tied to the input of said fourth latch;

configurable means for accumulating said 32 bit data word from each of said latch output;

means for generating a code representing a fixed word-length data routing command, said codes selectively configuring said latches, routing means and accumulating means to route fixed word-length data as a function of data bus width, said code embodied as a set of bused signals generated by a bus controller to thereby permit devices communicating by buses of different width to communicate with each other without requiring circuitry other than said bus controller; and means for transmitting said accumulated 32 bit data word to said data bus.

7. A system as set forth in claim 6 wherein:

the first data byte output by said I/O device is input to said first latch, said first multiplexer, said second multiplexer and said third multiplexer;

the second data byte output by said I/O device is input to the first multiplexer and the third multiplexer;

the third data byte output by said I/O device is input to the second multiplexer; and the fourth data byte output by said I/O device is input to the third multiplexer.

8. A system as set forth in claim 7 wherein said I/O device is an 8 bit device having a one byte output comprising said first data byte per subcycle, said 8 bit I/O device having four subcycles during each cycle of said 32 bit data bus, said first data byte output of said 8 bit I/O device being output to said first latch, said first multiplexer, said second multiplexer and said third multiplexer during each of first, second, third and fourth subcycles.

9. A system as set forth in claim 8 wherein said first multiplexer is enabled to output said first data byte output during said second subcycle, said second multiplexer is enabled to output said first data byte output during said third subcycle and said fourth multiplexer is enabled to output said first data byte output during said fourth subcycle.

10. A system as set forth in claim 7 wherein said I/O device is a 16 bit device having a two byte output comprised of said first and second data byte outputs per subcycle, said 16 bit I/O device having two subcycles during each cycle of said 32 bit data bus, said first data byte of said two byte output of said 16 bit I/O device being output to said first latch, said first multiplexer, said second multiplexer and said third multiplexer during first and second subcycles and said second data byte of said two byte output of said 16 bit I/O device being output to said first and third multiplexers during said first and second subcycles.

11. A system as set forth in claim 10 wherein said first multiplexer is enabled to output said second data byte output during said first subcycle, said second multiplexer is enabled to output said first data byte output during said second subcycle and said third multiplexer is enabled to output said second data byte output during said second subcycle.

12. A system as set forth in claim 7 wherein said I/O device is a 32 bit device having a four byte output comprised of said first, second, third and fourth data byte outputs per subcycle, said 32 bit I/O device having one subcycle during each cycle of said 32 bit data bus, said first data byte output of said 32 bit I/O device being output to said first latch, said first multiplexer, said second multiplexer and said third multiplexer during a first subcycle, said second data byte output of said 32 bit I/O device being output to said first multiplexer and said third multiplexer during said first subcycle, said third data byte output of said 32 bit I/O device being output to said second multiplexer during first subcycle and said fourth data byte output of said 32 bit I/O device being output to said third multiplexer during said first subcycle.

13. A system as set forth in claim 12 wherein said first multiplexer is enabled to output said second data byte output during said first subcycle, said second multiplexer is enabled to output said third data byte output during said first subcycle and said third multiplexer is enabled to output said fourth data byte output during said first subcycle.

14. A digital computer system having a fixed word-length data interface for transferring fixed word-length data units output by a 32 bit wide data bus to an 8, 16 or 32 bit wide I/O device, comprising:

configurable output driver means of a width equal to a width of said I/O device;

a first configurable multiplexer having at least one input tied to an output of said data bus and an output tied to said output driver means;

a second configurable multiplexer having at least one input tied to the output of said data bus and an output tied to said output driver means;

means for directly connecting the output of said data bus to an input of said output driver means;

configurable means for separately routing a first, second, third and fourth data byte output from said 32 bit data bus to said output driver means wherein the first data byte output by said data bus is input to said first multiplexer, the second data byte output by said data bus is input to said first multiplexer and said second multiplexer, the third data byte output by said data bus is input to said first multiplexer and said output driver means and the fourth data byte output by said data bus is input to said first multiplexer, said second multiplexer and said output driver means; and means for generating a code representing a fixed word-length data routing command, said code selectively configuring said output driver means, first and second multiplexers and routing means to route fixed word-length data as a function of data bus width, said code embodied as a set of bused signals generated by a bus controller to thereby permit devices communicating via buses of different width to communicate with each other without requiring circuitry other than said bus controller.

15. A system as set forth in claim 14 wherein said I/O device is an 8 bit device having a one byte input comprised of said first data byte output per subcycle, said 8 bit I/O device having four subcycles during each cycle of said 32 bit data bus, and where said first multiplexer is enabled to output said first data byte output during first, second, third and fourth subcycles.

16. A system as set forth in claim 14 wherein said I/O device is a 16 bit device having a two byte output comprised of said first and second data byte outputs per subcycle, said 16 bit I/O device having two subcycles during each cycle of said 32 bit data bus, and wherein said first multiplexer is enabled to output said first data byte output during first and second subcycle and said second multiplexer is enabled to output said second data byte output during said first and second subcycles.

17. A system as set forth in claim 14 wherein said I/O device is a 32 bit device having a four byte output comprised of said first, second, third and fourth data byte outputs per subcycle, said 32 bit I/O device having one subcycle during each cycle of said 32 bit data bus, and wherein said first multiplexer is enabled to output said first data byte output during first subcycle and said second multiplexer is enabled to output said second data byte output during said first subcycle.

18. A digital computer system having a fixed word-length data inter/ace for transferring fixed word-length data units output by an 8, 16 or 32 bit wide I/O device to a 32 bit wide data bus by accumulating said 8, 16 or 32 bit wide data units output by said I/O device into a 32 bit data word and for transferring fixed word-length data units output by said 32 bit wide data bus to said 8, 16 or 32 bit wide I/O device without data accumulation, comprising:

configurable first, second, third and fourth latches, each of said latches having an input and an output;

configurable means for separately routing a first, second, third and fourth data byte output from said I/O device to the input of said first, second, third and fourth latches, respectively;

configurable means for accumulating said 32 bit data word from each of said latch outputs;

means for transmitting said accumulated 32 bit data word to said data bus;

configurable output driver means of a width equal to the width of said I/O device;

configurable output multiplexer means having at least one input tied to the output of said data bus and an output tied to said output driver means;

means for directly connecting the output of said data bus to the input of said output driver means;

configurable means for separately routing a first, second, third and fourth data byte output from said 32 bit data bus to said output driver means; and means for generating a code representing a fixed word-length data routing command, said code selectively configuring said latches, accumulating means, output driver means, output multiplexer means and routing means to route fixed word-length data as a function of data bus width, said code embodied as a set of bused signals generated by a bus controller to thereby permit devices communicating via buses of different width to communicate with each other without requiring circuitry other than said bus controller.

19. A system as set forth in claim 18 wherein said means for separately routing said first, second, third and fourth data byte outputs from said I/O device to the input of one of said latches further comprises means for selectively routing said first, second, third and fourth data byte outputs.

20. A system as set forth in claim 19 wherein said means for selectively routing said first, second, third and fourth data byte outputs further comprises input multiplexing means having multiple multiplexer inputs for receiving at least two of said first, second, third and fourth data bytes output by said I/O device and a single multiplexer output.

21. A system as set forth in claim 20 wherein said means for separately routing said first, second, third and fourth data byte output from said I/O device to the input of one of said latches further comprises means for connecting the output of said I/O device to the input of said first latch, and wherein said input multiplexing means further comprises:

a first multiplexer having at least one input tied to the output of said I/O device and an output tied to the input of said second latch;

a second multiplexer having at least one input tied to the output of said I/O device and an output tied to the input of said third latch; and a third multiplexer having at least one input tied to the output of said I/O device and an output tied to the input of said fourth latch.

22. A system as set forth in claim 21 wherein said output multiplexing means further comprises:

a first multiplexer having at least one input tied to the output of said data bus and an output tied to said output driver means; and a second multiplexer having at least one input tied to the output of said data bus and an output tied to said output driver means.

23. A system as set forth in claim 22 wherein:

the first data byte output by said I/O device is input to said first latch, said first multiplexer, said second multiplexer and said third multiplexer;

the second data byte output by said I/O device is input to the first multiplexer and the third multiplexer;

the third data byte output by said I/O device is input to the second multiplexer; and the fourth data byte output by said I/O device is input to the third multiplexer.

24. A system as set forth in claim 23 wherein said means for selectively controlling which of said first, second, third and fourth bytes output by said I/O device are input to said multiplexing means further comprises means for transmitting a byte enable signal to each of said first, second, third and fourth multiplexers, said byte enable signal selecting which of said first, second, third and fourth data bytes are input to said corresponding multiplexer.

25. A computer system, comprising:

a processor configured to handle fixed word-length data units of a first specified number of bytes corresponding to a first data width;

a memory configured to handle fixed word-length data units of said first data width;

an I/O device configured to handle fixed word-length data units of a second specified number of bytes corresponding to a second data width;

a fixed word-length data bus configured to handle fixed word-length data units of said first data width, said fixed word-length data bus providing connections between said processor, said memory and said I/O device; and means for controlling transfer of fixed word-length data between said fixed word-length data bus and said I/O device, said controlling means selectively routing fixed word-length data under control of a fixed word-length data routing command as a function of bus width, said controlling means providing a set of bused signals generated by a bus controller to thereby permit communication between a processor, a memory and an I/O device via buses of differing width without requiring circuitry other than said bus controller;

wherein said controlling means adjust a width of fixed word-length data being transferred by modifying a route along which fixed word-length data bytes are transferred, said route based upon a width of transferring and receiving devices and a direction of transfer.

26. A system as set forth in claim 25 wherein said means for controlling the transfer of data from said data bus to said I/O device further comprises:

means for accumulating data units output by said I/O device before transferring said accumulated data units to said data bus; and wherein said controlling means modifies route along which data bytes are transferred to said accumulating means.

27. A system as set forth in claim 26 wherein said means for accumulating data units further comprises:

first, second, third and fourth latches, each said latch having an input and an output;

means for separately routing a first, second, third and fourth data byte output from said I/O device to the input of one of said latches; and means for latching said data bytes routed to the output of each said latch, thereby accumulating said 32 bit data word at said latch outputs.

28. A system as set forth in claim 27 further comprising input multiplexing means having multiple multiplexer inputs for receiving at least two of said first, second, third and fourth data bytes output by said I/O device and a single multiplexer output.

29. A system as set forth in claim 28 further comprising: means for connecting the output of said I/O device to the input of said first latch, and wherein said input multiplexing means further comprises:

a first multiplexer having at least one input tied to the output of said I/O device and an output tied to the input of said second latch;

a second multiplexer having at least one input tied to the output of said I/O device and an output tied to the input of said third latch; and a third multiplexer having at least one input tied to the output of said I/O device and an output tied to the input of said fourth latch.

30. A system as set forth in claim 29 wherein said output multiplexing means further comprises:

an output driver means;

a first output multiplexer having at least one input tied to the output of said data bus and an output tied to said output driver means;

a second output multiplexer having at least one input tied to the output of said data bus and an output tied to said output driver means; and means for directly connecting the output of said data bus to the input of said output driver means.

31. An system as set forth in claim 29 wherein:

the first data byte output by said I/O device is input to said first latch, said first multiplexer, said second multiplexer and said third multiplexer;

the second data byte output by said I/O device is input to the first multiplexer and the third multiplexer;

the third data byte output by said I/O device is input to the second multiplexer; and the fourth data byte output by said I/O device is input to the third multiplexer.

32. A system as set forth in claim 31 wherein said means for selectively controlling which of said first, second, third and fourth bytes output by said I/O device are input to said multiplexing means further comprises means for transmitting a byte enable signal to each of said first, second, third and fourth multiplexers, said byte enable signal selecting which of said first, second, third and fourth data bytes are input to said corresponding multiplexer.

33. A system for transferring fixed word-length data between first and second fixed word-length devices communicating via corresponding first and second communication buses, each of said buses having a different specified number of communication lines, comprising:

configurable means for routing fixed word-length data between said first and
second devices via said first and second buses, respectively;

controlling means for adjusting a width of data being transferred by modifying a route along which data bytes are transferred, said route based upon a width of transferring and receiving devices and a direction of transfer; and means for generating a code representing a data routing command, said code selectively configuring said routing means to route said fixed word-length data as a function of said number of lines and selectively configuring said controlling means based upon said width of transferring and receiving devices and said direction of transfer said code embodied as a set of bused signals generated by a bus controller to thereby permit devices communicating via buses of differing numbers of lines to communicate with each other without requiring circuitry other than said bus controller.

34. A system as recited in claim 33 further comprising a processor configured to handle data units of a first specified number of bytes corresponding to a first data width.

35. A system as recited in claim 33 further comprising a memory configured to handle data units of a first data width.

36. A system as recited in claim 33 further comprising an I/O device configured to handle data units of a second specified number of bytes corresponding to a second data width.

37. A system as recited in claim 33 further comprising a data bus configured to handle data units of a first data width, said data bus providing connections between a processor, a memory and an I/O device.

* * * * *